(12) United States Patent
Schwartz et al.

(10) Patent No.: US 9,766,321 B2
(45) Date of Patent: Sep. 19, 2017

(54) INDOOR POSITIONING WITH RADIO FREQUENCY CHIRP SIGNAL PROPAGATION DELAY MEASUREMENT

(71) Applicant: Digi International Inc., Minnetonka, MN (US)

(72) Inventors: John Robert Schwartz, Saratoga Springs, UT (US); Terry Michael Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 1099 days.

(21) Appl. No.: 13/830,291

(22) Filed: Mar. 14, 2013

(65) Prior Publication Data

US 2014/0266914 A1 Sep. 18, 2014

(51) Int. Cl.
  *G01S 3/02* (2006.01)
  *G01S 5/06* (2006.01)
  *G01S 5/14* (2006.01)
  *G01S 13/87* (2006.01)
  *G01S 5/02* (2010.01)

(52) U.S. Cl.
  CPC .............. *G01S 5/06* (2013.01); *G01S 5/0215* (2013.01); *G01S 5/14* (2013.01); *G01S 13/876* (2013.01); *G01S 5/0273* (2013.01); *G01S 13/878* (2013.01)

(58) Field of Classification Search
  CPC . G01S 5/06; G01S 5/0215; G01S 5/14; G01S 5/0273; G01S 13/876; G01S 13/878
  USPC .................................. 342/463, 458, 450
  See application file for complete search history.

(56) References Cited

U.S. PATENT DOCUMENTS

| 4,532,603 | A | 7/1985 | Gerard |
| 6,396,866 | B1 | 5/2002 | Upton et al. |
| 6,493,405 | B1 | 12/2002 | Olaker et al. |
| 6,943,405 | B2 | 9/2005 | Bryant et al. |
| 7,068,704 | B1 * | 6/2006 | Orr .......................... G01S 5/02 375/139 |
| 7,177,343 | B1 | 2/2007 | Citta et al. |
| 7,215,698 | B2 * | 5/2007 | Darby ................... G01S 5/0081 132/260 |

(Continued)

FOREIGN PATENT DOCUMENTS

| EP | 1599001 A1 | 11/2005 |
| WO | WO-03092183 A2 | 6/2003 |

OTHER PUBLICATIONS

European Patent Office, "Extended European Search Report", "from Foreign Counterpart of U.S. Appl. No. 13/830,291", Sep. 8, 2014, pp. 1-13, Published in: EP.

(Continued)

*Primary Examiner* — Chuong P Nguyen
(74) *Attorney, Agent, or Firm* — Fogg & Powers LLC

(57) ABSTRACT

A radio frequency locator system and method. First, second and third reference devices are operable to transmit a plurality of spread spectrum chirp signals frequency offset from one another. An object device is operable to receive the plurality of spread spectrum chirp signals, the object device is further operable to evaluate the received plurality of spread spectrum chirp signals for relative phase shifts between the plurality of spread spectrum chirp signals and derive a fine propagation time between the reference devices and the object device using the phase shifts between the spread spectrum chirp signals. The reference devices determine their location independent of the object device and determine the location of the object device as a function of each of their locations and of their range to the object device.

26 Claims, 10 Drawing Sheets

(56) References Cited

U.S. PATENT DOCUMENTS

| | | | | |
|---|---|---|---|---|
| 8,483,703 | B2* | 7/2013 | Swope | H04W 64/00 455/456.1 |
| 8,861,568 | B2* | 10/2014 | Petersen | G01S 11/08 375/139 |
| 8,976,060 | B2* | 3/2015 | Schaffner | G01S 11/04 342/118 |
| 2003/0022651 | A1 | 1/2003 | Bannasch et al. | |
| 2005/0163201 | A1 | 7/2005 | Krasner | |
| 2006/0114747 | A1 | 6/2006 | Hentati et al. | |
| 2008/0309543 | A1* | 12/2008 | Schaffner | H04B 1/7183 342/21 |
| 2008/0310481 | A1 | 12/2008 | Schaffner | |
| 2010/0008270 | A1 | 1/2010 | Ahn et al. | |
| 2011/0260856 | A1* | 10/2011 | Rossmann | G01S 5/0205 340/539.13 |
| 2012/0300814 | A1 | 11/2012 | Schaffner | |

OTHER PUBLICATIONS

European Patent Office, "Partial European Search Report from EP Application No. 14158036.5 mailed Jun. 25, 2014", "from Foreign Counterpart of U.S. Appl. No. 13/830,291", Jun. 25, 2014, pp. 1-5, Published in: EP.

"European Application Serial No. 08252093.3, filed on Jun. 18, 2008, European Search Report mailed Oct. 10, 2008", 7 pgs.

"European Application Serial No. 08252093.3, Office Action Mailed Jun. 15, 2009", 1 pg.

"European Application Serial No. 08252099.0, Office Action Mailed Jun. 15, 2009", 1 pg.

"European Application Serial No. 08252099.0, Search Report mailed Oct. 6, 2008", 7 pgs.

Hengstler, S., et al., "A novel chirp modulation spread spectrum technique for multiple access", 2002 IEEE Seventh International Symposium on Spread Spectrum Techniques and Applications, (2002), 73-77.

Kowatsch, M., et al., "A Spread-Spectrum Concept Combining Chirp Modulation and Pseudonoise Coding", IEEE Transactions on Communications, 31(10), (Oct. 1983), 1133-1142.

Springer, A., et al., "Spread Spectrum Communications Using Chirp Signals", IEEE/AFCEA EUROCOMM 2000. Information Systems for Enhanced Public Safety and Security., (2000), 166-170.

European Patent Office, "Office Action from EP Application No. 14158036.5 dated Jul. 14, 2016", "from Foreign Counterpart of U.S. Appl. No. 13/830,291", Jul. 14, 2016, pp. 1-6, Published in: EP.

\* cited by examiner

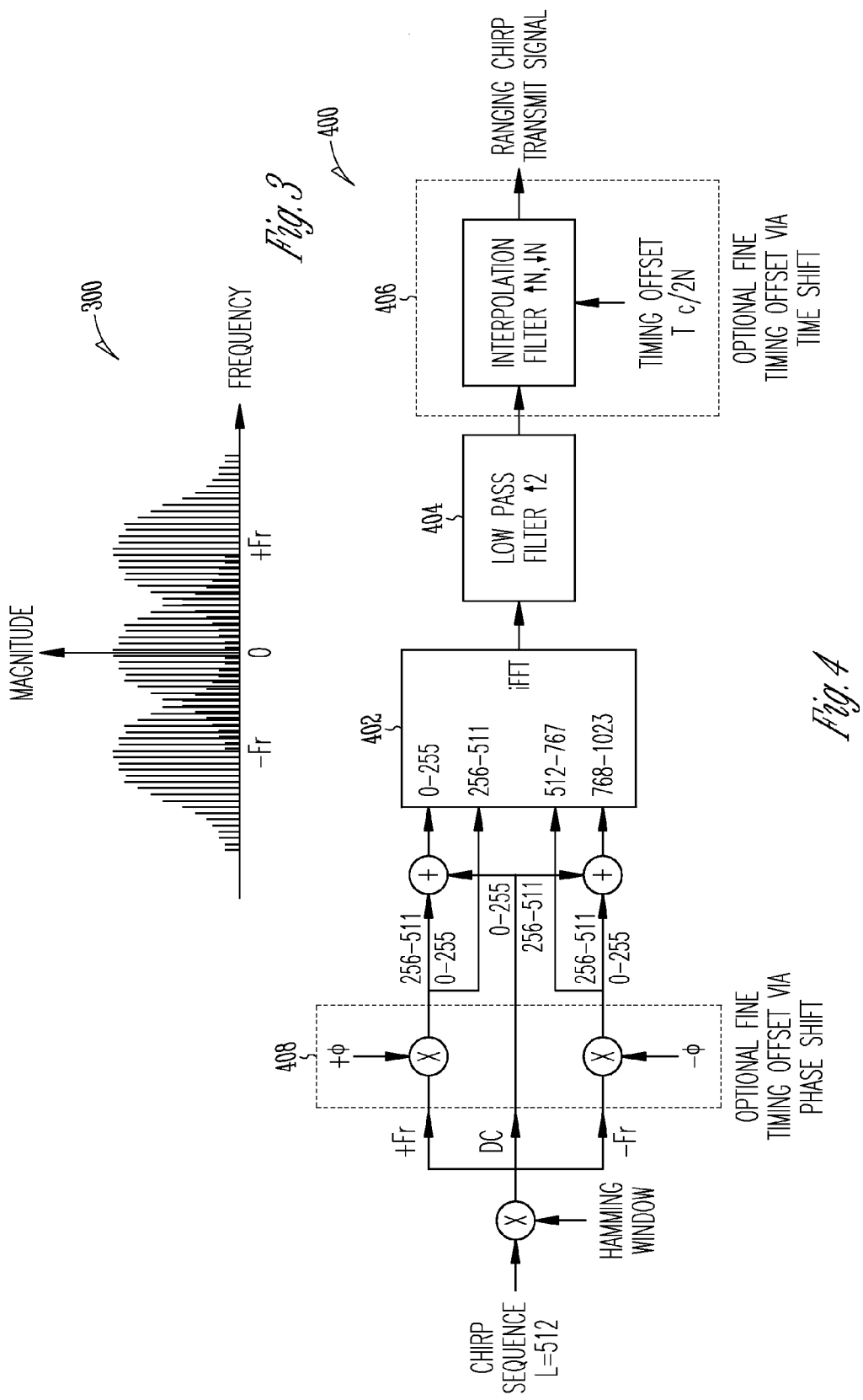

$$701 \sim \emptyset_0 = \tan^{-1}(imag\{C^+ + C^-\}/real\{C^+ + C^-\})/2\pi$$

$$702 \sim \Delta\emptyset_{-1} = \frac{\tan^{-1}\left(\frac{imag\{C^-\}}{real\{C^-\}}\right)}{2\pi} - \emptyset_0$$

$$703 \sim \Delta\emptyset_{+1} = \frac{\tan^{-1}\left(\frac{imag\{C^+\}}{real\{C^+\}}\right)}{2\pi} - \emptyset_0$$

$$704 \sim k = 2(\Delta\emptyset_{+1} - \Delta\emptyset_{-1})$$

$$705 \sim \emptyset_0 = \tan^{-1}(imag\{C^0\}/real\{C^0\})/2\pi$$

Fig. 7

INDOOR POSITIONING WITH RADIO FREQUENCY CHIRP SIGNAL PROPAGATION DELAY MEASUREMENT

BACKGROUND

It can be important to track people and devices indoors, but an indoor environment introduces factors that make such tracking difficult. A number of approaches have been used in the past. Cell technology can use the power from various towers to try and triangulate any position. Wifi access points have also been used. If the location of the Wifi access point is known before hand, then the received signal strength from each access point can be used to triangulate and estimate the position.

Global Position System (GPS) has been used in a number of different applications, from tracking containers to providing positioning for autonomous robotic vehicles. One thing that GPS cannot do, however, is provide positioning indoors because the frequency and power of the GPS satellite signal is not strong enough to penetrate the roof and walls of typical building construction materials. Various technologies have attempted to combine GPS data (taken when a device was outside) with other information, such as Cell triangulation, Wifi and accelerometer data to try and estimate indoor position with greater accuracy.

Another approach to determining indoor positioning is to use previously installed nodes to record signal strength—using the proximity to these sensors to establish approximate locations.

Each of these methods suffers from poor accuracy. In addition, there are some applications where it is difficult to pre-position multiple pre-installed nodes inside the building where positioning is desired. Systems that require prior infrastructure indoors do not work in, for instance, emergency or military situations; these types of applications often do not use positioning for this reason and instead try to use remote cameras for monitoring. Remote cameras, however, can only work when visibility is good.

BRIEF DESCRIPTION OF THE FIGURES

FIG. 3 shows a spectrum of a transmitted signal, consistent with an embodiment of the invention.

FIG. 4 shows a multi-frequency chirp transmitter, consistent with an embodiment of the invention.

FIG. 7 shows calculation chirp phases, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

By using radios that are capable of determining distance, it is possible to provide positioning of an object or person inside of a building. This can be used to track emergency personnel such as firemen, equipment such as medical infusion pumps in hospitals, or military robotic vehicles exploring indoor spaces to determine safety.

When GPS is not available, or is unreliable, one can turn to triangulation based on nodes in known locations. Triangulation in a structure such as a building or within a dense urban area is difficult due to the interaction of RF signals with objects in and around the structures. In a typical RF environment the signal may reflect off objects in the vicinity, and the direct path to the receiver may be obstructed by walls or other objects. This multipath at the receiver will result in large inaccuracies in the phase measurement. Multipath can cause the tones to fade in amplitude and shift in phase independently from one another.

The use of a simple signal such as a sine wave for ranging in such an environment can lead to uncertainty as to the timing or phase of the sine wave signal being received; superimposition of a multipath or reflected sinusoid onto a prompt ray sinusoid can lead to difficulty in distinguishing the prompt ray from the multipath ray.

Figure 1:
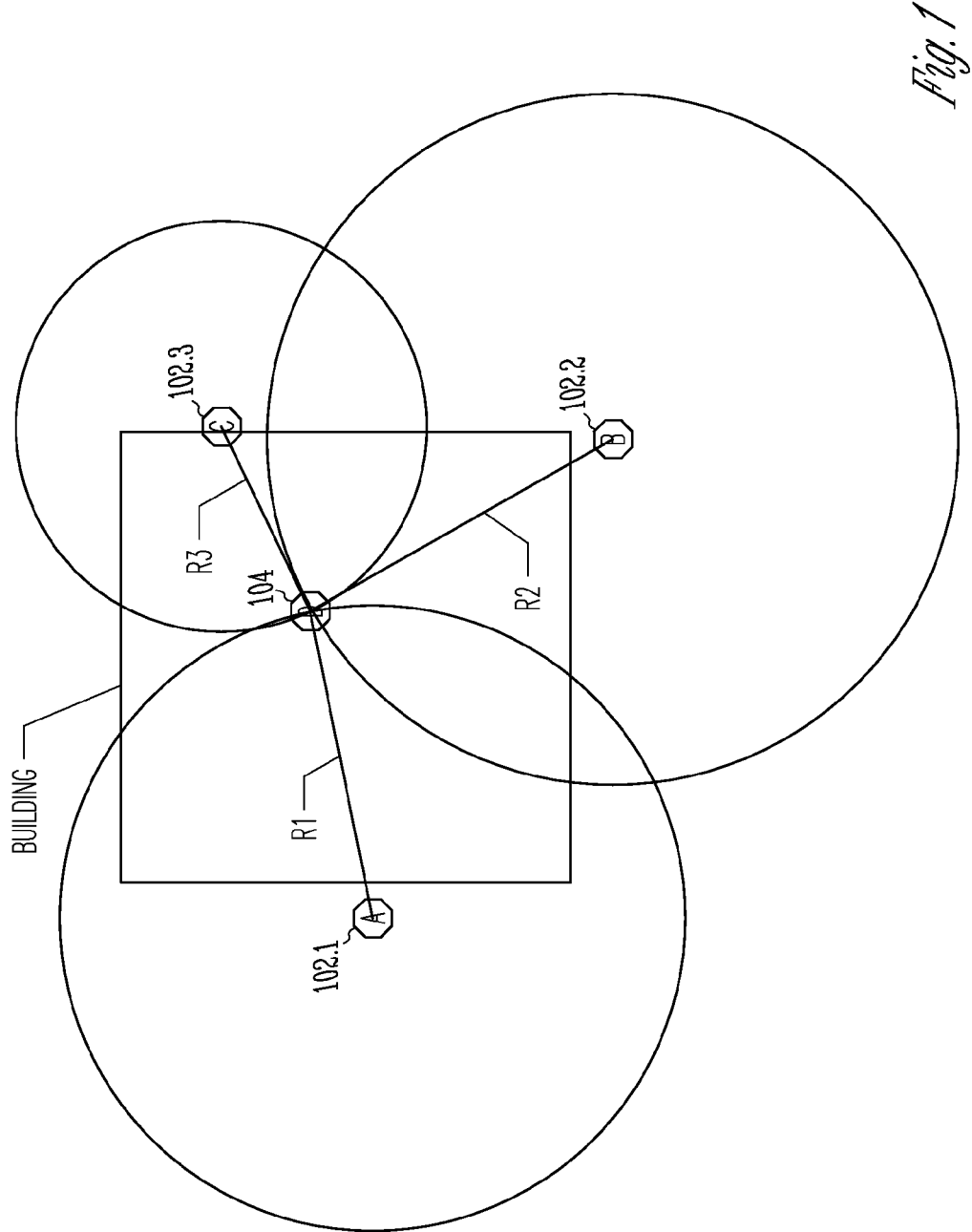
FIG. 1 shows an example radio frequency locator system, consistent with an example embodiment of the invention.

FIG. 1 illustrates a locator system 100 that can be used to locate an object or a person inside a structure such as a building. In system 100 of FIG. 1, three radio frequency (RF) nodes 102.1-102.3 are placed external to a building. In one example embodiment each of the nodes 102 has the ability to determine range based on radio transmissions. Between them, they triangulate the position of object 104 using chirp spread spectrum signals in the manner detailed below. Nodes 102 and 104 cooperate to establish the distance between each node 102 and node 104. To establish this distance, in some example embodiments, each node 102 determines range to node 104 via a round-trip transmission of the chirp-based signal from node 102 to node 104, or from node 104 to node 102. In other example embodiments, node 104 determines range to each node 102 via a round-trip transmission of the chirp-based signal from node 104 to node 102.

By using chirp spread spectrum signals, we can achieve more accurate radio frequency ranging in the presence of multipath signals. This is achieved in various embodiments by using chirp spreading at multiple frequency offsets, using relative phase measurements of the despread chirp symbols to provide fine timing information, and using a window positioned to minimize the influence of near multipath signals.

In some embodiments, nodes 102 transmit a wider bandwidth spread spectrum signal instead of the discrete tones to reduce the effects of multipath. Since delayed shifts of a spread spectrum signal are uncorrelated with one another, the effect of multipath upon the phase measurements will be greatly reduced.

In one example embodiment, each node 102 is a reference node used to triangulate object 104 (the position node). Accurate ranging measurement using a chirp sequence spread spectrum signal means that nodes 102 can be placed in a position outside the structure where an object is to be located and can still locate the position node very accurately. If we know the position of each of the reference nodes accurately, we can determine an absolute location of the object as a function of the position of the reference nodes.

The reference nodes' positions can be established via GPS, via differential GPS or from known coordinates based on, for instance, a previous survey, known map coordinates or known indoor building coordinates. In one embodiment, each reference node includes a global positioning system sensor, wherein the reference nodes determine their location based on data from the global positioning system sensor.

In one embodiment, each reference node includes an interface for receiving location data. In some embodiments, location data is loaded by a user based on a previous survey, known map coordinates or known indoor building coordinates. In another embodiment, similar data is downloaded to each reference node via a network from, for instance, a local or cloud-based server.

In some example embodiments, reference nodes 102 operate with position node 104 to establish its position. In one such example embodiment, each reference node 102 determines range to the position node 104. The range information for each reference node 102 is then sent with the node's known coordinates to the position node 104 as a data packet and the position node determines its position based on the range information and the known coordinates of each reference node 102.

In another example embodiment, position node 104 transmits a chirp spread spectrum signal to each reference node 102 and determines range to each node 102 as a function of the return signal from each reference node 102. The reference ranging information accumulated for each reference node 102 at the position node 104 is sent to one of the reference nodes (the aggregator reference node) and, in one embodiment, is used to locate the position node in reference to the aggregator reference node 102.

Figure 2:
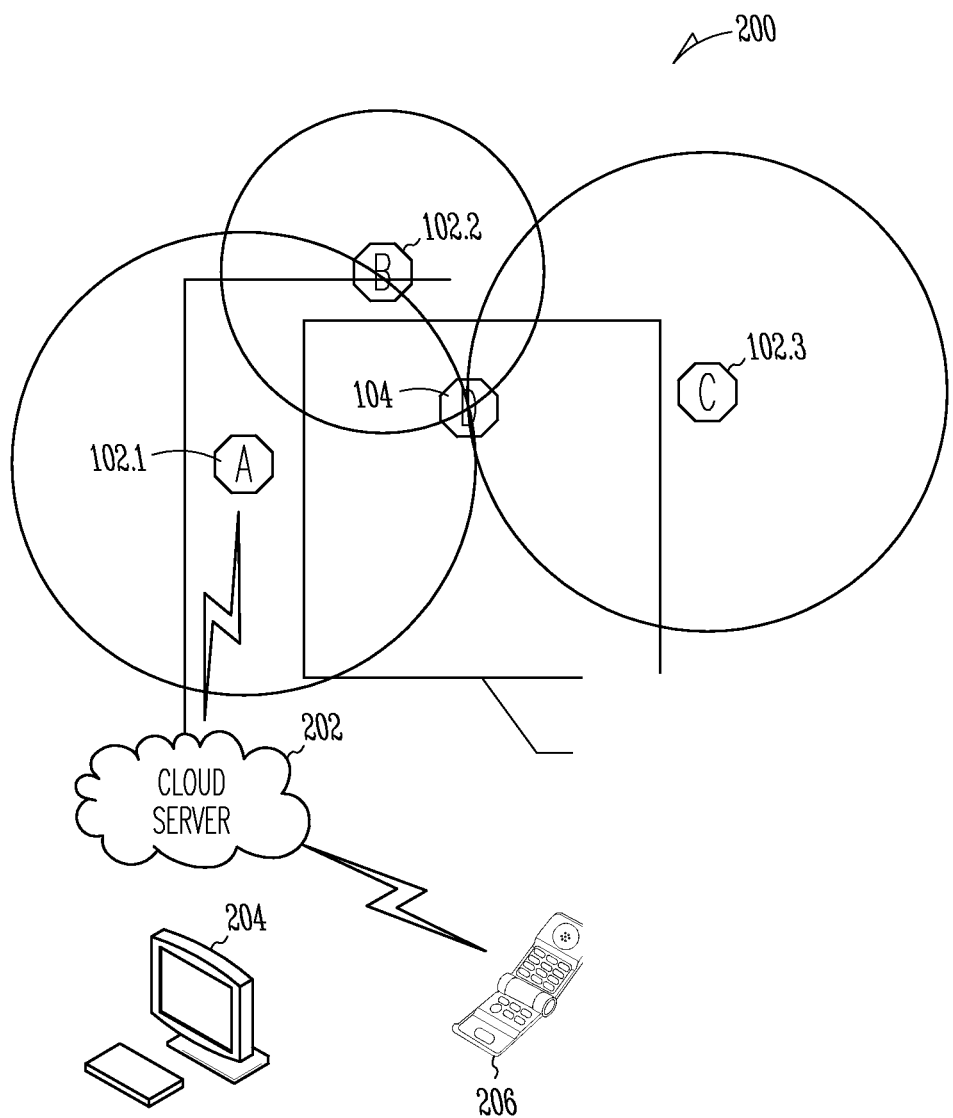
FIG. 2 shows another example radio frequency locator system, consistent with an example embodiment of the invention.

In some example embodiments, reference nodes 102 operate with position node 104 to establish the position of position node 102 for an outside person or device. An example locator system 200 is shown in FIG. 2. In the example embodiment shown in FIG. 2, three radio frequency (RF) nodes 102.1-102.3 are placed external to a building. In one example embodiment, each of the nodes 102 has the ability to determine range based on radio transmissions. Between them, they triangulate the position of object 104 using chirp spread spectrum signals in the manner detailed below. One or more of the nodes 102 and 104 are connected via a network to a server such as cloud server 202.

Nodes 102 and 104 cooperate to establish the distance between each node 102 and node 104. To establish this distance, in some example embodiments, each node 102 determines range to node 104 via a round-trip transmission of the chirp-based signal from node 102 to node 104, or from node 104 to node 102.

In some such embodiments, position node 104 transmits a chirp spread spectrum signal to each reference node 102 and determines range to each node 102 as a function of the return signal from each reference node 102. The reference ranging information accumulated for each reference node 102 at the position node 104 is sent to server 202 either directly from positioning node 104 or through one of the reference nodes 102. In other example embodiments, one or more reference nodes determine ranging information and transfer the information to server 202.

In one example embodiment, raw range data from position node 104 is sent to the cloud either from position node 104, or the range information is sent to each reference node 102 and they individually send the information on to the cloud. In another embodiment, one of the RN nodes acts as a range data aggregator and sends the accumulated data to server 202 at appropriate intervals.

In one example embodiment, raw range data is sent to server 202 the cloud either by each individual node or through one of the nodes acting as a gateway. The location of position node 104 can then be computed via the raw data by the gateway prior to sending the data to the cloud, by cloud server 202 itself, or by an application running on a PC 204 or a smart phone 206 that retrieves the raw data from the cloud and computes the position.

A chirp spread spectrum ranging transmit signal that can be used in systems 100 and 200 will be discussed next.

FIG. 4 shows an example multi-frequency chirp transmitter 400 which can be used in node 102 to provide a chirp-based ranging signal. Transmitter 400 produces a transmit signal with a spectrum 300 such as is shown in FIG. 3. In the example shown, three un-modulated, length 512 chirp sequences are transmitted as the ranging signal. The chirps are centered at frequencies of −Fr, 0, and +Fr. The first chirp sweeps from −2Fr to 0, the second sweeps from −Fr to +Fr, and the third sweeps from 0 to +2Fr as shown at 300. The chirp sequences in this example are transmitted simultaneously but they may also be transmitted individually at separate times. To create the transmit signal, a length 512 complex chirp sequence is generated and then multiplied by a real-valued length 512 windowing function. When transmitting the range reply signal, the fine timing of the transmission may be set by either introducing phase offsets on the chirp waveforms (at 408) or by adjusting the time delay using an interpolation/decimation filter (at 406). These are shown as optional functions on the block diagram.

The windowed chirp sequence is replicated three times and fed to a length 1024 inverse FFT at 402 to convert the signal to the time domain. Note that a chirp sequence in the frequency domain is equivalent to the complex conjugate of the chirp sequence in the time domain. Therefore, transforming a chirp sequence in the frequency domain to the time domain simply creates a chirp sequence that sweeps in the opposite direction. The composite signal is then filtered with an up-sampling low pass filter at 404 and optionally delayed with a fine timing interpolation filter at 406.

To measure the propagation delay, the arrival of the prompt ray is estimated with a high degree of accuracy. A spreading code with a 20 MHz bandwidth provides a resolution of only 50 nanoseconds; this is roughly fifty feet in terms of distance. In order to achieve sub-chirp timing accuracies three half-bandwidth chirps are transmitted offset in frequency by 0, +Fr, and −Fr, where Fr is equal to one-fourth the transmission bandwidth, BW.

When the transmitting station at a node 102 sends the range request signal, the three chirps are sent with the same phase. At the receiver in object 104, if the chirps are de-spread with perfect alignment to the received signal, the three phases will be identical. If the receive signal is offset in time, the three phases will shift due to the frequency offset of each chirp signal. Using a combination of the chirp offset and the chirp phases, the propagation delay of the RF signal can be very accurately estimated.

Chirp spreading reduces the influence of multipath on the measurement; note, however, that multipath with delays less than a chirp period from the prompt ray may still interfere with the measurement.

Figure 5:
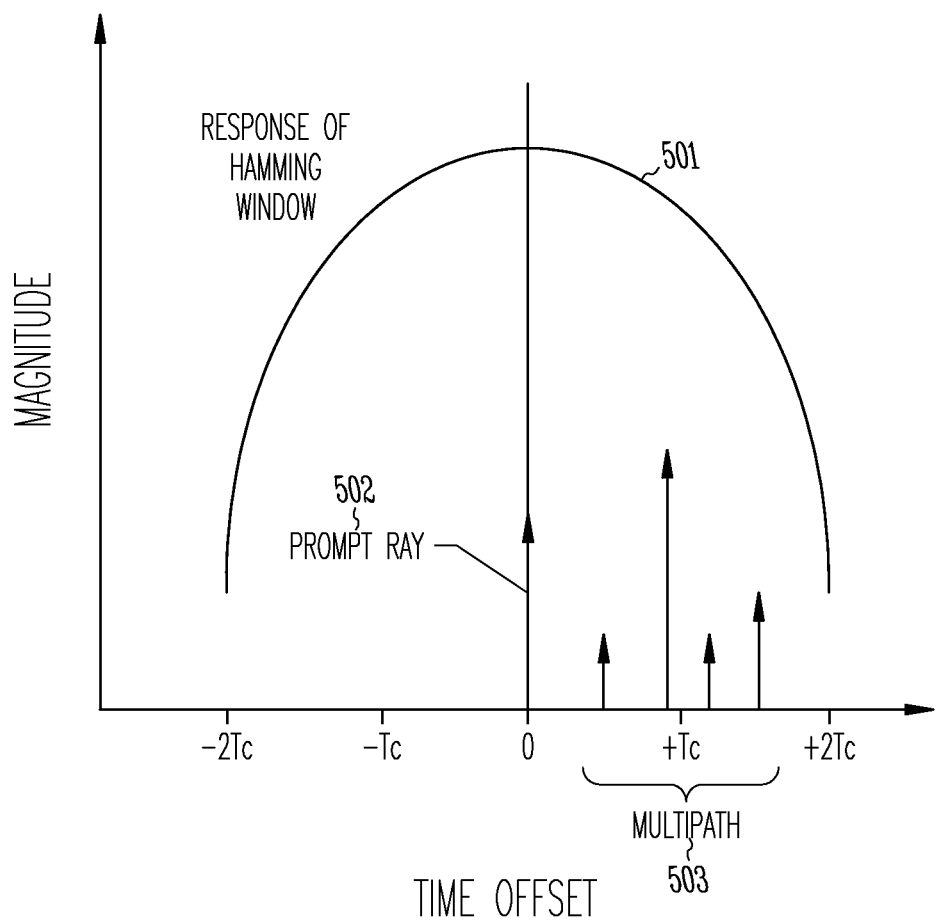
FIG. 5 shows an example of multipath or reflected rays less than a chirp period from the prompt ray interfering with prompt ray reception, consistent with an example embodiment of the invention.

FIG. 5 shows an example of multipath or reflected rays less than a chirp period from the prompt ray interfering with prompt ray reception, consistent with an example embodiment of the invention. The magnitude response of the hamming window is shown at 501, centered around the prompt ray 502. Any multipath 503 within this window will combine with the prompt ray and potentially interfere with the measurement.

Figure 6:
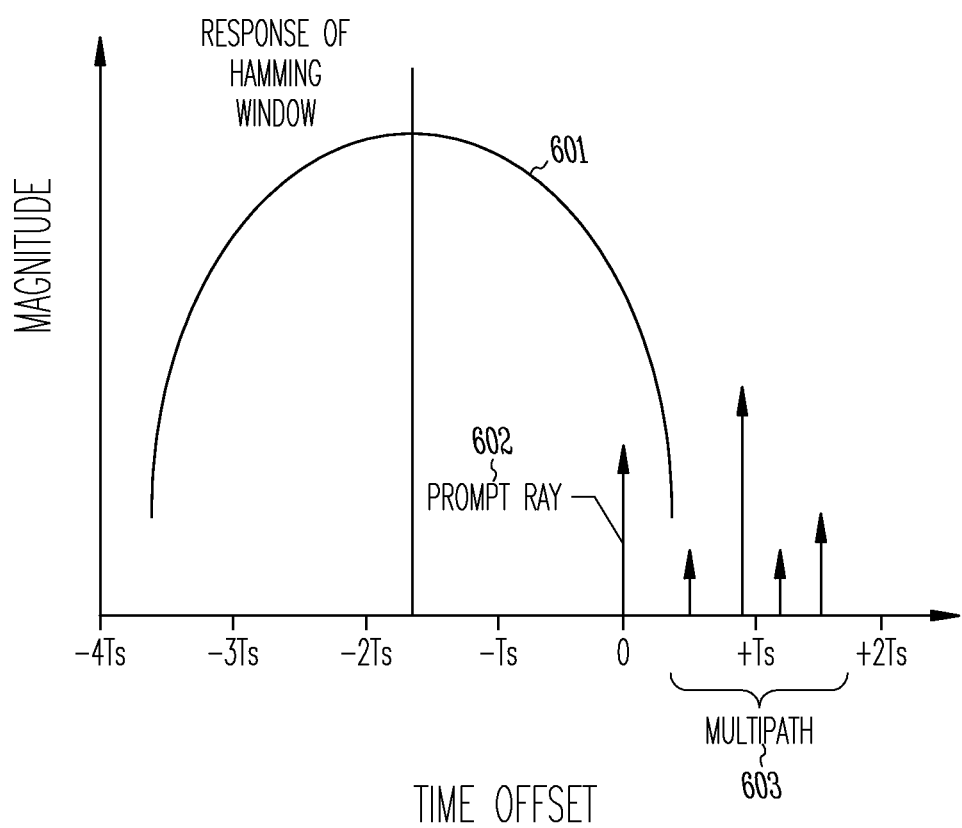
FIG. 6 illustrates shifting the hamming window despreading offset to minimize multipath interference with the prompt ray, consistent with an example embodiment of the invention.

FIG. 6 illustrates shifting the hamming window despreading offset to minimize multipath interference with the prompt ray, consistent with an example embodiment of the invention. In order to minimize the effects of the nearby multipath seen in FIG. 5, the de-spread offset is advanced as much as is practical while still maintaining an accurate phase measurement. The offset in a more detailed example is advanced until the de-spread energy drops to a pre-determined threshold level. At this offset, the phase measurement takes place. This results in the hamming window capturing the prompt ray 602, while greatly attenuating or excluding the multipath signals 603.

The phase measurement is important for providing an accurate measurement. The relative phases of the frequency chirps reflect the de-spread timing offset with respect to the received ray. This is a direct consequence of the two chirp signals having a non-zero center frequency. The chirp centered at −BW/4 will experience a phase shift of −πk/2 radians, where k is the time difference between the ray and the de-spread offset in units of Ts. Likewise, the chirp centered at +BW/4 will experience a phase shift of +πk/2 radians. The third chirp signal located at 0 Hz is used as a phase reference and does not experience a phase shift when the de-spread offset changes.

FIG. 7 shows calculation of chirp phases, consistent with an example embodiment of the invention. Here, the reference phase, $Ø_0$ is calculated at 701, and the delta phases for the negative frequency centered chirp at 702 and positive frequency centered chirp at 703. In the equations, $C^0$ is the complex despread value for the zero frequency centered or DC chirp, $C^-$ is the complex despread value for the negative frequency centered chirp and $C^+$ is the complex despread value for the positive frequency centered chirp. The fine timing offset, k, can then be calculated as shown at 704.

To extend the phase measurement range in a further example, a third chirp symbol is added at DC, and a reference phase is calculated from the DC chirp as shown at 705.

The raw timing measurement is then the coarse timing offset corresponding to the point of the delay measurement minus this fine timing value. In order to calculate the over-the-air propagation delay, the internal path delays of both radios is also subtracted. In addition, the delay is adjusted based on the estimate of the relative oscillator inaccuracies between the two radios.

The effect of multipath on the de-spread prompt ray at the receiver is minimized by selecting a timing offset near the estimated location of the prompt ray. The location is based upon the estimated channel impulse response. One method for determining the approximate prompt ray offset is to select the earliest arriving offset whose energy is above a threshold. The threshold can then be calculated relative to the maximum energy offset or relative to the composite signal energy.

At this timing offset, a block of data is buffered and transformed into the frequency domain. The data from the FFT is separated into the proper frequency band for each chirp, and then the data is de-spread in the frequency domain. Note that frequency domain de-spreading is almost identical to time domain de-spreading because a chirp signal in the frequency domain is simply the complex conjugate of the signal in the time domain. The signal is de-spread by correlating the data with a chirp sequence.

It is desirable to attenuate any multipath following the prompt ray in order to obtain a reliable phase measurement of the prompt ray signal. This is accomplished by advancing the time offset as illustrated previously in FIG. 6. However, each time the time offset is adjusted, a computation-intensive FFT is performed. In order to avoid this complexity, some embodiments of the invention employ a method in which the FFT window is effectively moved but the timing offset remains stationary. This is accomplished by multiplying each band of FFT output data by a near-DC complex sinusoid. The frequency of the complex sinusoid is adjusted to position the window such that the prompt ray's phase can be measured with little influence from any nearby multipath. The frequency is adjusted until the de-spread energy of the chirp symbols are within a given range. At this point, the phase of the de-spread chirp symbols is measured. The phases reflect the fine timing offset of the prompt ray relative to the coarse data buffer timing.

The station receiving the range request signal responds with a range reply transmission at a known delay following the request. The timing of the transmission is precise, so that the round trip delay estimate is accurate. The transmit timing can be conveyed in different manners, including:

1. The transmission time of the range reply signal is precisely set using a high rate interpolation/decimation filter
2. The transmission time of the range reply signal is set coarsely (e.g., a Nyquist sample period or half sample period) and the fine transmission time offset is conveyed by shifting the phase of the chirp symbols.
3. The transmission time of the range reply signal is set coarsely (e.g., a Nyquist sample period or half sample period) and the fine transmission time offset is conveyed in a data message.

In the example presented here, the third option is used, sending the fine timing offset information in a data portion of the range reply frame.

Figure 8:
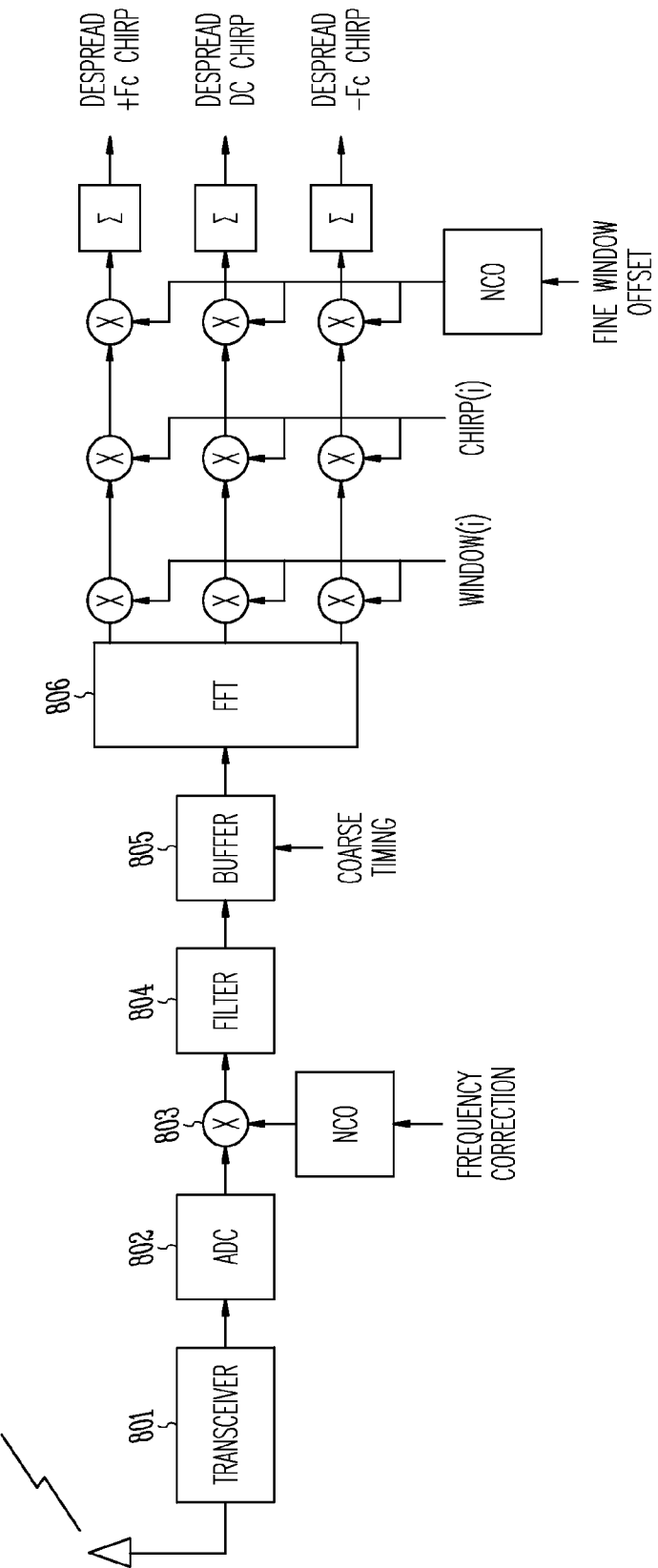
FIG. 8 shows a block diagram of a ranging receiver, consistent with an example embodiment of the invention.

FIG. 8 shows a block diagram of a ranging receiver, consistent with an example embodiment of the invention. Here, a transceiver 801 down converts the RF signal to a 0 Hz IF signal (baseband signal). An ADC 802 converts the analog baseband signal to a digital signal. Any frequency offset error is corrected by multiplying the baseband signal with a complex sinusoid generated by a numerically-controlled oscillator (NCO) at 803. The data is then low-pass filtered at 804 and buffered at 805 to create a block of data (length of 1024 in this example).

The block of data feeds a 1024 point FFT at 806, which converts the time domain data into the frequency domain. The FFT output is separated into three bands: the upper band centered at +Fc which uses FFT output bins 0 through 511, the middle band centered at DC (0 Hz) which uses FFT output bins 0 through 255 and 768 through 1023, and the lower band centered a −Fc which uses FFT output bins 512 through 1023.

The data for each of the three frequency bands is multiplied by a windowing function and the chirp sequence. The data is then multiplied a third time by a complex sinusoid fed by an NCO. Finally, the 512 data samples for each frequency band are accumulated to provide the de-spread chirp values. The frequency of the NCO is adjusted based upon the energy of the de-spread chirp symbols. Once the desired energy level is achieved, the phases of the three de-spread chirp values are measured. The phase values provide the fine timing offset of the prompt ray relative to the coarse offset. Note that the chirp phase and NCO phase are combined to eliminate one of the complex multiply operations in a further example.

Figure 9:
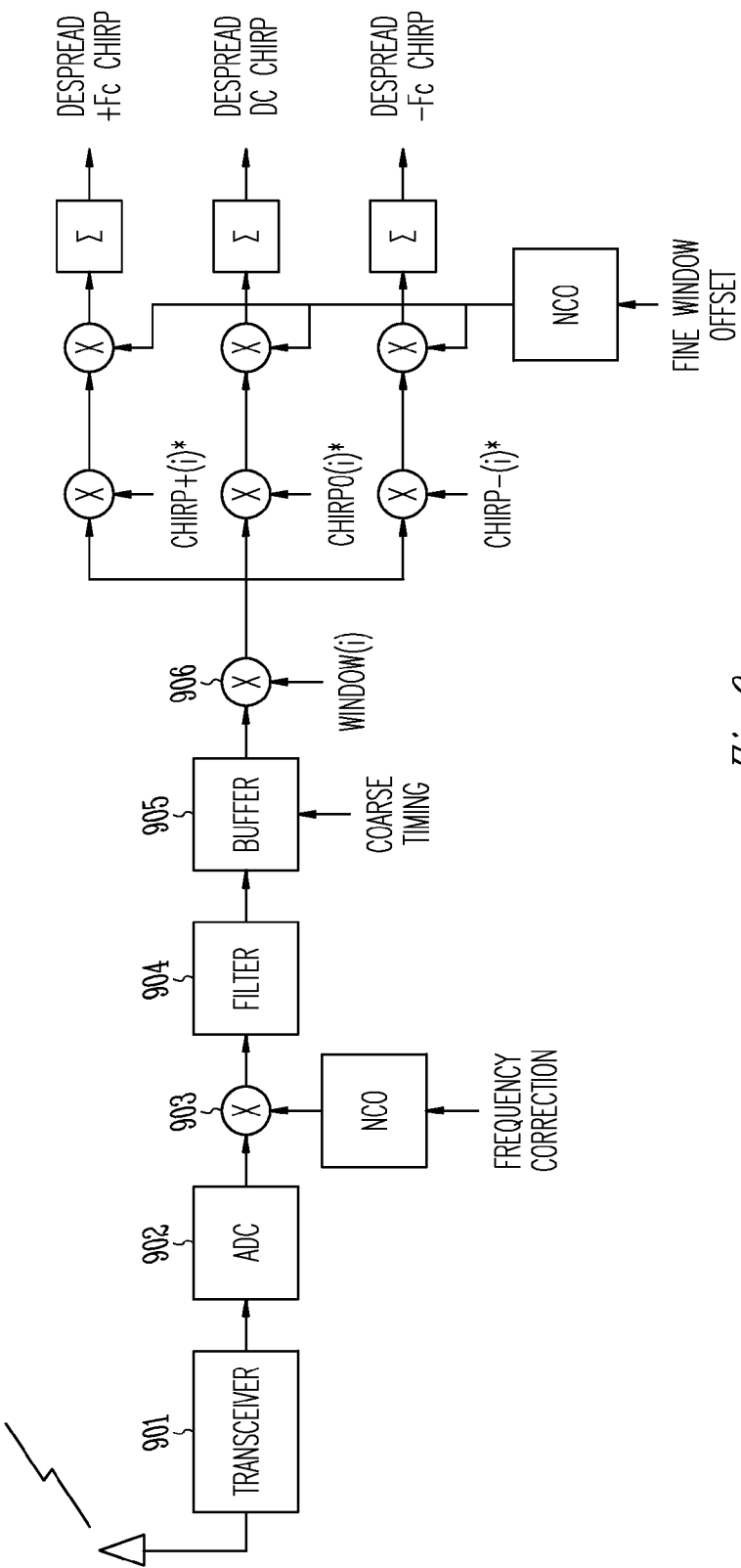
FIG. 9 shows a block diagram of an alternate ranging receiver, consistent with an example embodiment of the invention.

FIG. 9 is a block diagram of an alternate implementation of a ranging receiver, consistent with an example embodiment of the invention. In this example, the signal is despread in the time domain eliminating the need for a fast fourier transform. The block of data at the output of buffer 905 is multiplied by the windowing function by multiplier 906. This data is then multiplied by the complex conjugate of the expected data sequences. The data sequence chirp0 is the chirp signal generated at the sampling rate of the received block of data. The data sequence, chirp+, is the chirp0 sequence multiplied by a positive frequency offset of +Fc; likewise, chirp− is the chirp0 sequence multiplied by a negative frequency offset of −Fc. Similar to the frequency domain implementation shown in FIG. 8, the three signals are multiplied by a complex sinusoid and then accumulated to produce the despread symbols.

With the time domain implementation of FIG. 9, there may be some degradation in accuracy. The timing offset of the buffered data may not align precisely with the received symbols resulting in a misalignment of the windowing function. However, when using long chirp sequences this degradation is fairly insignificant. In either implementation it may also be desirable to compensate for any non-linear phase or magnitude variations in the response of the radio's signal path. This may be accomplished by multiplying the received block of data by a complex data sequence derived from measuring the channel response of the radio.

Figure 10:
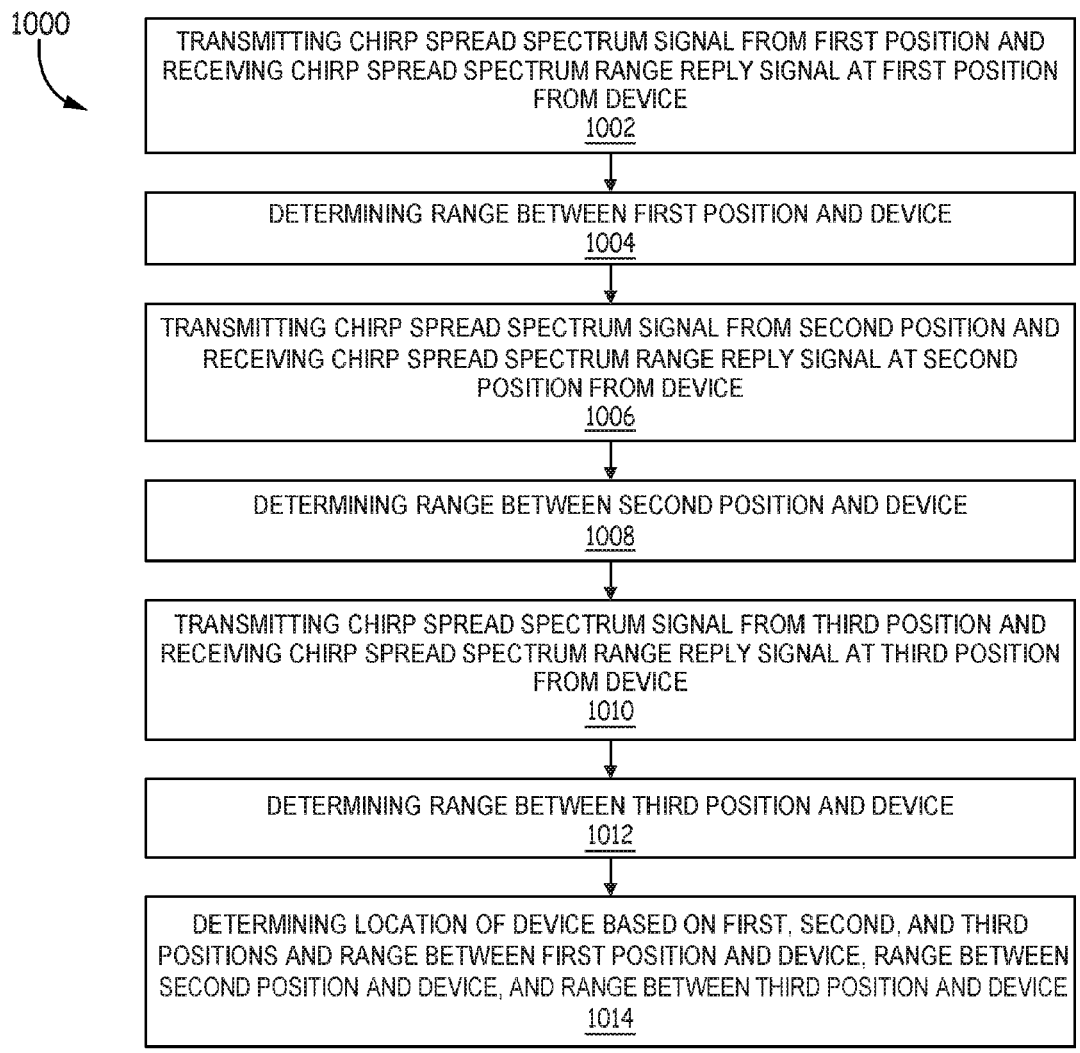
FIG. 10 shows a flow diagram illustrating an exemplary embodiment of a method of determining the location of a device capable of receiving and transmitting a chirp spread spectrum signal.

FIG. 10 shows a flow diagram illustrating an exemplary embodiment of a method 1000 of determining the location of a device capable of receiving and transmitting a chirp spread spectrum signal. The method 1000 includes transmitting a chirp spread spectrum signal from the first position and receiving a chirp spread spectrum range reply signal at the first position from the device (block 1002). The method 1000 further includes determining a range between the first position and the device (block 1004). The method 1000 further includes transmitting a chirp spread spectrum signal from the second position and receiving a chirp spread spectrum range reply signal at the second position from the device (block 1006). The method 1000 further includes determining a range between the second position and the device (block 1008). The method 1000 further includes transmitting a chirp spread spectrum signal from the third position and receiving a chirp spread spectrum range reply signal at the third position from the device (block 1010). The method further includes determining a range between the third position and the device (block 1012). The method further includes determining the location of the device based on the first, second, and third positions and the range between the first position and the device, the range between the second position and the device, and the range between the third position and the device (block 1014).

Figure 11:
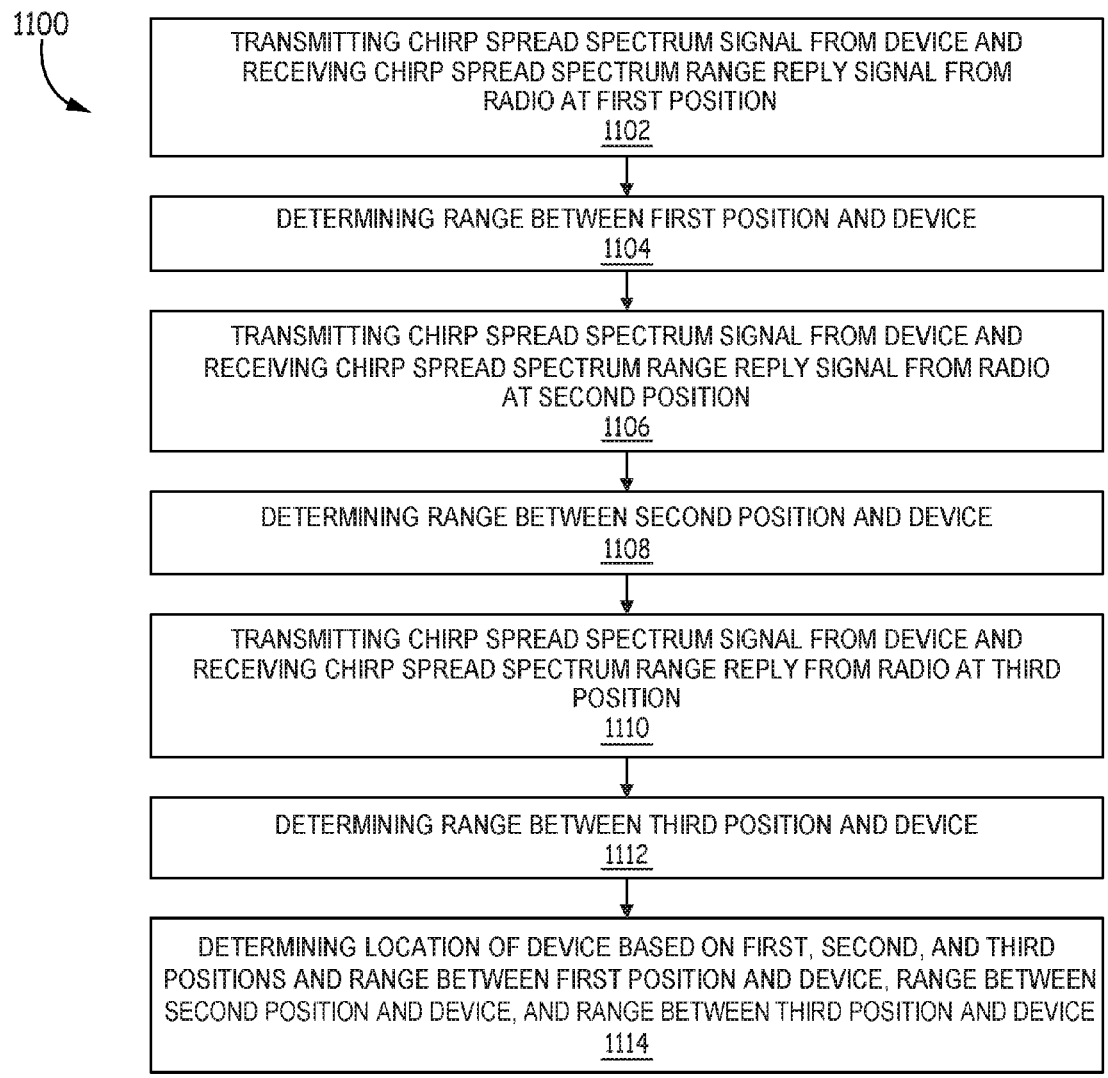
FIG. 11 shows a flow diagram illustrating another exemplary embodiment of a method of determining the location of a device capable of receiving and transmitting a chirp spread spectrum signal.

FIG. 11 shows a flow diagram illustrating another exemplary embodiment of a method 1100 of determining the location of a device capable of receiving and transmitting a chirp spread spectrum signal. The method 1100 includes transmitting a chirp spread spectrum signal from the device and receiving a chirp spread spectrum range reply signal from a radio at the first position (block 1102). The method 1100 further includes determining a range between the first position and the device (block 1104). The method further includes transmitting a chirp spread spectrum signal from the device and receiving a chirp spread spectrum range reply signal from a radio at the second position (block 1106). The method further includes determining a range between the second position and the device (block 1108). The method further includes transmitting a chirp spread spectrum signal from the device and receiving a chirp spread spectrum range reply signal from a radio at the third position (block 1110). The method further includes determining a range between the third position and the device (block 1112). The method 1100 further includes determining the location of the device based on the first, second, and third positions and the range between the first position and the device, the range between the second position and the device, and the range between the third position and the device (block 1114).

These examples illustrate how distance between two radio frequency devices can be estimated by receiving a plurality of spread spectrum chirp signals frequency offset from one another, and evaluating the received plurality of spread spectrum chirp signals for relative phase shifts between the plurality of spread spectrum chirp signals. A fine propagation time is derived using the phase shifts between the spread spectrum chirp signals. In a further example, a frequency domain despreading window is shifted to reduce the influence of time-delayed near multipath signals in receiving the plurality of spread spectrum chirp signals.

The main advantages of this approach is that the reference nodes can be either inside or outside of the building, and with only three nodes it could be possible to get better accuracy than current methods. Also, while only three reference nodes are required for accurate positioning, a fourth reference node located at a different height is all that would be required to determine the floor of a multi-story building. With the reference nodes 102 external to the building, their position can be accurately determined without the need for any pre-mapping of internal structures. With the nodes indoors, minimal mapping may be required, or the units could be located near windows and get a reference position via GPS. Additional reference nodes do not have to be added to improve accuracy as with other methods. Additional nodes only need to be added if the indoor structure is sufficiently large as to limit the radio range to a minimum of three devices.

The present approach uses a chirp sequence radio frequency transmission to determine range, and does so with fewer reference nodes and with greater positional accuracy.

Position data can be accumulated on the cloud and provided for computation of positional data and for consumption by various devices Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A method of determining a location of a device capable of receiving and transmitting chirp spread spectrum signals, the method performed at least in part by the device, a first reference device, a second reference device, a third reference device, or a server, or any combination thereof, the method comprising:
    transmitting a first chirp spread spectrum signal from the first reference device to the device, the first reference device having a first position;
    receiving a first plurality of chirp spread spectrum range reply signals at the first reference device from the device, the first plurality of chirp spread spectrum range reply signals frequency offset from one another;
    evaluating the first plurality of chirp spread spectrum range reply signals for first phase shifts between the first plurality of chirp spread spectrum range reply signals;
    deriving a first propagation time between the device and the first reference device using the first phase shifts;
    determining a first range between the first position and the device based on the first propagation time;
    transmitting a second chirp spread spectrum signal from the second reference device to the device, the second device having a second position;
    receiving a second chirp spread spectrum range reply signal at the second reference device from the device;
    determining a second range between the second position and the device based on the second chirp spread spectrum range reply signal;
    transmitting a third chirp spread spectrum signal from the third reference device to the device, the third device having a third position;
    receiving a third chirp spread spectrum range reply signal at the third reference device from the device;
    determining a third range between the third position and the device based on the third chirp spread spectrum range reply signal; and
    determining the location of the device based on the first position of the first reference device, the second position of the second reference device, the third position of the third reference device, the first range between the first position and the device, the second range between the second position and the device, and the third range between the third position and the device.

2. The method of claim 1, wherein the first phase shifts are relative phase shifts; and
    wherein the first propagation time is a fine propagation time.

3. The method of claim 2, wherein receiving a first chirp spread spectrum range reply signal at the first reference device further includes determining a coarse propagation time established by a propagation delay of at least one of the plurality of chirp signals plus known processing delays, and combining the coarse propagation delay and the fine propagation time to establish an accurate propagation time.

4. The method of claim 1, further comprising shifting a frequency domain despreading window within a receiver at the first reference device to reduce the influence of time-delayed near multipath signals.

5. The method of claim 1, wherein at least one of the first chirp spread spectrum signal, the second chirp spread spectrum signal, and the third chirp spread spectrum signal is a function of chirp sequences centered at $-F_r$, 0 and $+F_r$, respectively.

6. The method of claim 1, wherein at least one of the first chirp spread spectrum range reply signal, the second chirp spread spectrum range reply signal, and the third chirp spread spectrum range reply signal is offset via a phase shift.

7. The method of claim 1, wherein at least one of the first chirp spread spectrum range reply signal, the second chirp spread spectrum range reply signal, and the third chirp spread spectrum range reply signal is delayed via an interpolation/decimation filter.

8. The method of claim 1, further comprising transmitting the determined location of the device to a server.

9. The method of claim 1, wherein determining the location of the device includes transmitting the first position of the first reference device, the second position of the second reference device, the third position of the third reference device, the first range between the first position and the device, the second range between the second position and the device, and the third range between the third position and the device to a server in the cloud.

10. The method of claim 1, further comprising:
    wherein the location is within a structure;
    wherein the first position, the second position, and the third position are external to the structure;
    positioning the first reference device at the first position when the location of the device is to be determined;
    positioning the second reference device at the second position when the location of the device is to be determined; and
    positioning the third reference device at the third position when the location of the device is to be determined.

11. A method of determining a location of a device capable of receiving and transmitting chirp spread spectrum signals, the method performed at least in part by the device, a first reference device, a second reference device, a third reference device, or a server, or any combination thereof, the method comprising:
    transmitting a first chirp spread spectrum signal from the device to the first reference device, the first reference device having a first position;
    receiving a first plurality of chirp spread spectrum range reply signals at the device from the first reference device, the first plurality of chirp spread spectrum range reply signals frequency offset from one another;
    evaluating the received plurality of spread spectrum chirp signals for first phase shifts between the plurality of spread spectrum chirp signals;
    deriving a first propagation time between the device and the first reference device using the first phase shifts;
    determining a first range between the first position and the device based on the first phase shifts;
    transmitting a second chirp spread spectrum signal from the device to the second reference device, the second device having a second position;

receiving a second chirp spread spectrum range reply signal at the device from the second reference device;

determining a second range between the second position and the device based on the second chirp spread spectrum range reply signal;

transmitting a third chirp spread spectrum signal from the device to the third reference device, the third device having a third position;

receiving a third chirp spread spectrum range reply signal at the device from the third reference device;

determining a third range between the third position and the device based on the third chirp spread spectrum range reply signal; and determining the location of the device based on the first position of the first reference device, the second position of the second reference device, the third position of the third reference device, the first range between the first position and the device, the second range between the second position and the device, and the third range between the third position and the device.

12. The method of claim 11, wherein the first phase shifts are relative phase shifts; and wherein the first propagation time is a fine propagation time.

13. The method of claim 12, wherein receiving a first chirp spread spectrum range reply signal at the device further includes determining a coarse propagation time established by propagation delay of at least one of the plurality of chirp signals plus known processing delays, and combining the coarse propagation delay and the fine propagation time to establish an accurate propagation time.

14. The method of claim 11, further comprising shifting a frequency domain despreading window within a receiver at the device to reduce the influence of time-delayed near multipath signals.

15. The method of claim 11, wherein at least one of the first chirp spread spectrum signal, the second chirp spread spectrum signal, and the third chirp spread spectrum signal is a function of chirp sequences centered at $-F_r$, 0 and $+F_r$, respectively.

16. The method of claim 11, wherein at least one of the first chirp spread spectrum range reply signal, the second chirp spread spectrum range reply signal, and the third chirp spread spectrum range reply signal is offset via a phase shift.

17. The method of claim 11, wherein at least one of the first chirp spread spectrum range reply signal, the second chirp spread spectrum range reply signal, and the third chirp spread spectrum range reply signal is delayed via an interpolation/decimation filter.

18. The method of claim 11, further comprising transmitting the determined location of the device to a server.

19. The method of claim 11, wherein determining the location of the device includes transmitting the first position of the first reference device, the second position of the second reference device, the third position of the third reference device, the first range between the first position and the device, the second range between the second position and the device, and the third range between the third position and the device to a server in the cloud.

20. The method of claim 11, further comprising:
wherein the location is within a structure;
wherein the first position, the second position, and the third position are external to the structure;
positioning the first reference device at the first position when the location of the device is to be determined;
positioning the second reference device at the second position when the location of the device is to be determined; and
positioning the third reference device at the third position when the location of the device is to be determined.

21. A radio frequency locator system, comprising:
a plurality of reference devices including a first reference device, a second reference device, and a third reference device, wherein the reference devices are configured to transmit a plurality of spread spectrum chirp signals frequency offset from one another;
an object device configured to receive the plurality of spread spectrum chirp signals, the object device further configured to evaluate the received plurality of spread spectrum chirp signals for phase shifts between the plurality of spread spectrum chirp signals and derive a propagation time between each reference device and the object device using the phase shifts between the spread spectrum chirp signals;
wherein at least one of the reference devices and the object device determine ranges between the reference devices and the object based on the propagation time between each reference device and the object;
wherein the reference devices determine their location independent of the object device and determine a location of the object device as a function of each of their locations and of their range to the object device.

22. The radio frequency locator system of claim 21, wherein the propagation time between each reference device and the object is a fine propagation time; and wherein at least one of the reference devices and the object device are further configured to:
determine a coarse propagation time established by propagation delay of at least one of the plurality of chirp signals plus known processing delays, and
combine the coarse propagation delay and the fine propagation time to establish an accurate propagation time.

23. The radio frequency locator system of claim 21, at least one of the reference devices and the object device are further configured to shift a frequency domain despreading window in the receiver to reduce the influence of time-delayed near multipath signals in receiving the plurality of spread spectrum chirp signals.

24. The radio frequency locator system of claim 21, wherein the reference devices include a global positioning system sensor, wherein the reference devices determine their location based on data from the global positioning system sensor.

25. The radio frequency locator system of claim 21, wherein the reference devices include an interface, wherein location data is loaded into each device via the interface.

26. The radio frequency locator system of claim 21, wherein the reference devices are positioned external to a structure when the location of the object device is to be determined; and wherein the location of the object device is within the structure.

* * * * *